US012585514B2

(12) United States Patent　　　　(10) Patent No.: US 12,585,514 B2

Nersisyan et al.　　　　　　　　(45) Date of Patent: Mar. 24, 2026

---

(54) CONTENT DELIVERY NETWORK-BASED ROUTING OF APPLICATION PROGRAMMING INTERFACE REQUESTS TO CLOUD SERVICE INSTANCES

(71) Applicant: HEWLETT PACKARD ENTERPRISE DEVELOPMENT LP, Spring, TX (US)

(72) Inventors: Roman Nersisyan, Santa Clara, CA (US); Michael Zayats, Santa Clara, CA (US); Travis S. Tripp, Ft. Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 32 days.

(21) Appl. No.: 18/541,909

(22) Filed: Dec. 15, 2023

(65) Prior Publication Data

US 2025/0199892 A1　　Jun. 19, 2025

(51) Int. Cl.
　　*G06F 9/54*　　　(2006.01)
(52) U.S. Cl.
　　CPC ..................................... *G06F 9/547* (2013.01)
(58) Field of Classification Search
　　CPC ............. G06F 9/54; G06F 9/547; G06F 9/451
　　See application file for complete search history.

(56) References Cited

U.S. PATENT DOCUMENTS

| | | | | |
|---|---|---|---|---|
| 11,165,634 | B2 * | 11/2021 | Medam .................. | G06F 9/5061 |
| 11,228,573 | B1 * | 1/2022 | Rangasamy ...... | H04L 12/40006 |
| 11,263,201 | B2 * | 3/2022 | Bar Oz ................. | G06F 16/219 |
| 11,637,831 | B2 * | 4/2023 | Heldman .............. | H04L 67/125 |
| | | | | 726/4 |
| 2019/0306138 | A1 * | 10/2019 | Carru .................... | H04L 9/3247 |
| 2019/0334757 | A1 * | 10/2019 | Hill ....................... | H04L 41/046 |
| 2022/0335384 | A1 * | 10/2022 | Sharma ................ | G06Q 10/103 |
| 2024/0037267 | A1 * | 2/2024 | Kwong ................. | H04L 63/104 |

OTHER PUBLICATIONS

Design Gurus; "System Design Basics: Navigating the World of CDN"; https://www.designgurus.io/blog/content-delivery-network-CDN-system-design-basics?gclid= Cj0KCQiA7OqrBhD9ARIsAK3UXh0kLgFhFk4IFLHCSU ... downloaded on Dec. 14, 2023, 16 pp.

(Continued)

*Primary Examiner* — Chirag R Patel

(74) *Attorney, Agent, or Firm* — Trop, Pruner & Hu, P.C.

(57)　　　　　　ABSTRACT

A process includes receiving, by a server associated with a content delivery network, a first request that specifies an application programming interface (API) call to a cloud service. The first request includes data that represents an authorization bearer token, a geographical service region identifier and an API call group. The process includes routing, by the server, the API call to an instance of the cloud service. The routing includes determining, by the server, a client identifier based on the authorization bearer token; and identifying, by the server, a location of the instance based on the client identifier, the geographical region identifier and the API call group identifier. The routing includes, responsive to the identification, sending, by the receiver, a second request corresponding to the API call to the location.

20 Claims, 9 Drawing Sheets

(56) References Cited

OTHER PUBLICATIONS

Cloudflare; "What is a cloud API?"; https://www.cloudflare.com/learning/security/api/what-is-a-cloud-api/#:~:text=Cloud%20APIs%20are%20software%20programs,of%20data%20between%20software%20programs; downloaded on Dec. 14, 2023; 5 pp.

Citrix|Blogs; "DaaS vs. SaaS vs. PaaS vs. IaaS: Which is right for your business?"; https://www.citrix.com/blogs/2022/01/20/saas-vs-paas-vs-iaas-vs-daas/#:~:text=Businesses%20now%20have%20several%different,Desktop%20as%20a%20service%20(DaaS); downloaded Dec. 14, 2023; 11 pp.

Microsoft Learn; "Container Apps—Create or Update—REST API (Azure Azure Container Apps)"; https://learn. microsoft.com/en-us/rest/api/containerapps/container-apps/create-or-update?view=rest-containerapps-2023-05-01&tabs=HTTP; API Version; May 1, 2023; downloaded on Dec. 14, 2023; 30 pp.

Chekmazov, Roman; AWS for M&E Blog; "Application Programming Interface (API) call samples for AWS Elemental Live"; https://aws.amazon.com/blogs/media/application-programming-interface-api-call-samples-for-aws-elemental-live/; Feb. 15, 2022; downloaded on Dec. 14, 2023; 8 pp.

Google Cloud; "Creating API requests and handling responses | Compute Engine Documentation |"; https://cloud.google.com/compute/docs/api/how-tos/api-requests-responses; downloaded on Dec. 14, 2023; 12 pp.

Hewlett Packard Enterprise; "introduction—API Reference"; https://hewlettpackard.github.io/iLOAmpPack-Redfish-API-Docs/; downloaded on Dec. 14, 2023; 323 pp.

* cited by examiner

Figures 6, 7:
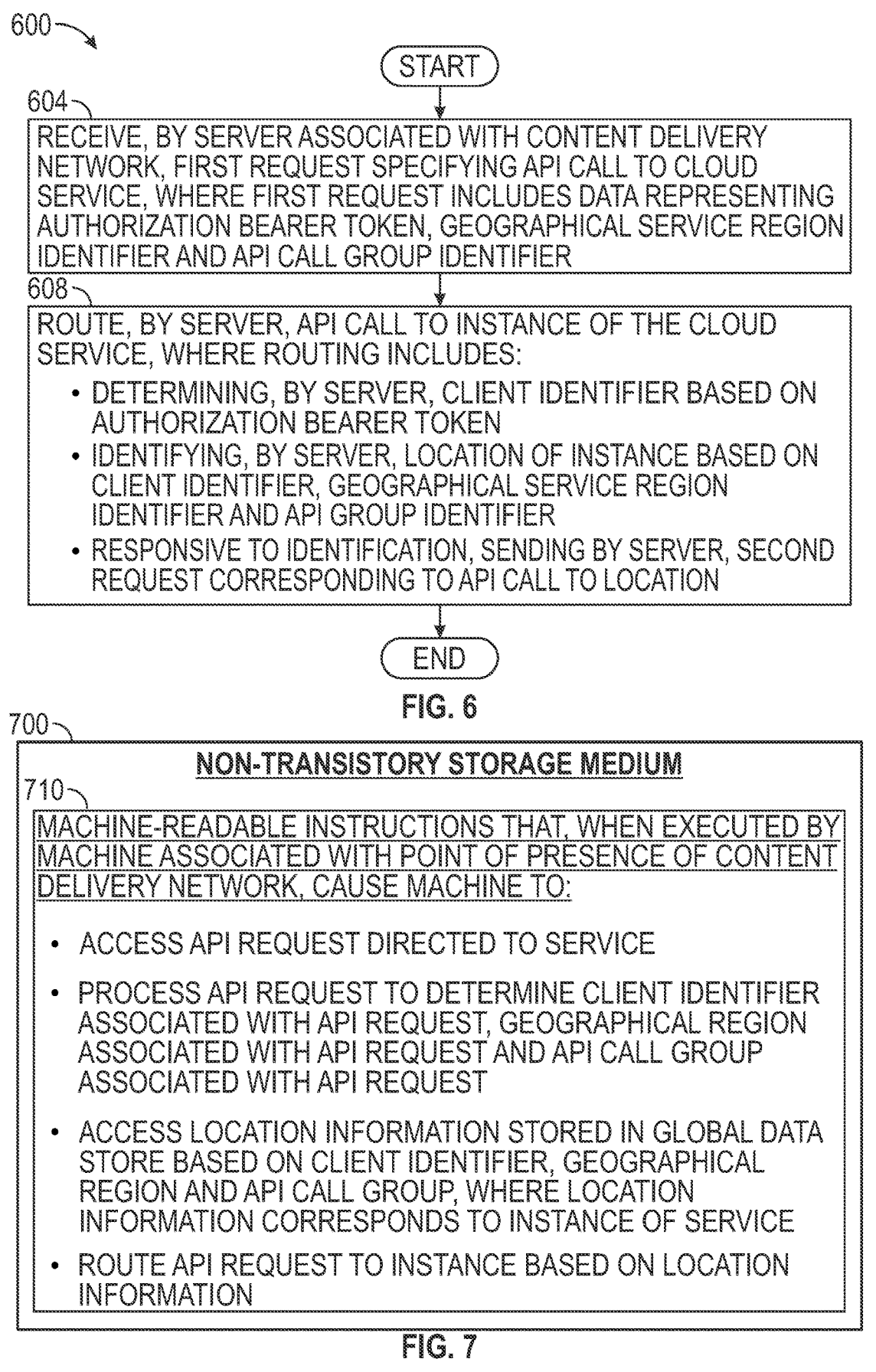

600

START

604

RECEIVE, BY SERVER ASSOCIATED WITH CONTENT DELIVERY NETWORK, FIRST REQUEST SPECIFYING API CALL TO CLOUD SERVICE, WHERE FIRST REQUEST INCLUDES DATA REPRESENTING AUTHORIZATION BEARER TOKEN, GEOGRAPHICAL SERVICE REGION IDENTIFIER AND API CALL GROUP IDENTIFIER

608

ROUTE, BY SERVER, API CALL TO INSTANCE OF THE CLOUD SERVICE, WHERE ROUTING INCLUDES:

- DETERMINING, BY SERVER, CLIENT IDENTIFIER BASED ON AUTHORIZATION BEARER TOKEN
- IDENTIFYING, BY SERVER, LOCATION OF INSTANCE BASED ON CLIENT IDENTIFIER, GEOGRAPHICAL SERVICE REGION IDENTIFIER AND API GROUP IDENTIFIER
- RESPONSIVE TO IDENTIFICATION, SENDING BY SERVER, SECOND REQUEST CORRESPONDING TO API CALL TO LOCATION

END

NON-TRANSISTORY STORAGE MEDIUM

710

MACHINE-READABLE INSTRUCTIONS THAT, WHEN EXECUTED BY MACHINE ASSOCIATED WITH POINT OF PRESENCE OF CONTENT DELIVERY NETWORK, CAUSE MACHINE TO:

- ACCESS API REQUEST DIRECTED TO SERVICE

- PROCESS API REQUEST TO DETERMINE CLIENT IDENTIFIER ASSOCIATED WITH API REQUEST, GEOGRAPHICAL REGION ASSOCIATED WITH API REQUEST AND API CALL GROUP ASSOCIATED WITH API REQUEST

- ACCESS LOCATION INFORMATION STORED IN GLOBAL DATA STORE BASED ON CLIENT IDENTIFIER, GEOGRAPHICAL REGION AND API CALL GROUP, WHERE LOCATION INFORMATION CORRESPONDS TO INSTANCE OF SERVICE

- ROUTE API REQUEST TO INSTANCE BASED ON LOCATION INFORMATION

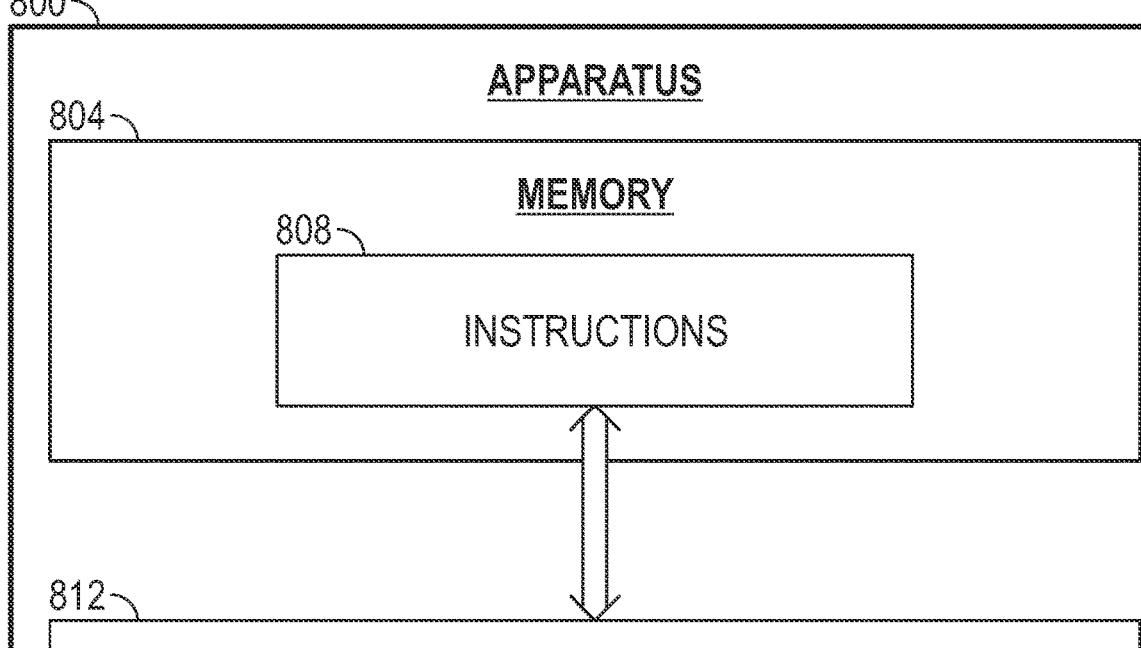

APPARATUS

804

MEMORY

808

INSTRUCTIONS

812

HARDWARE PROCESSOR ASSOCIATED WITH POINT OF PRESENCE OF CONTENT DELIVERY NETWORK, WHERE HARDWARE PROCESSOR TO:

- RECEIVE API REQUEST DIRECTED TO SERVICE

- BASED ON URL REPRESENTED BY FIRST DATA OF API REQUEST, DETERMINE GEOGRAPHICAL REGION IDENTIFIER FROM SUBDOMAIN NAME OF URL AND DETERMINE API CALL GROUP IDENTIFIER FROM PATH OF URL

- BASED ON AUTHORIZATION BEARER TOKEN REPRESENTED BY SECOND DATA OF API REQUEST, DETERMINE CLIENT IDENTIFIER

- DETERMINE LOCATION CORRESPONDING TO INSTANCE OF SERVICE BASED ON GEOGRAPHICAL REGION IDENTIFIER, API CALL GROUP IDENTIFIER AND CLIENT IDENTIFIER

- FORWARD API REQUEST TO LOCATION

FIG. 8

CONTENT DELIVERY NETWORK-BASED ROUTING OF APPLICATION PROGRAMMING INTERFACE REQUESTS TO CLOUD SERVICE INSTANCES

BACKGROUND

A cloud service provider may provide application programming interfaces (APIs) for purposes of allowing clients (e.g., applications), through API calls, to configure, manage and interact with cloud service instances that are hosted by the provider. An API call may specify a function, action or operation to be performed by a cloud service instance.

BRIEF DESCRIPTION OF THE DRAWINGS

FIG. 6 is a flow diagram depicting a process that uses a CDN to route an API request according to an example implementation.

FIG. 7 is an illustration of a non-transitory storage medium that stores machine-readable instructions that, when executed by a machine associated with a point of presence of a CDN, cause the machine to route an API request to an instance of a service according to an example implementation.

FIG. 8 is a block diagram of an apparatus that includes a hardware processor that is associated with a CDN and executes machine-readable instructions to route an API request to an instance of a service according to an example implementation.

DETAILED DESCRIPTION

Figure 1A:
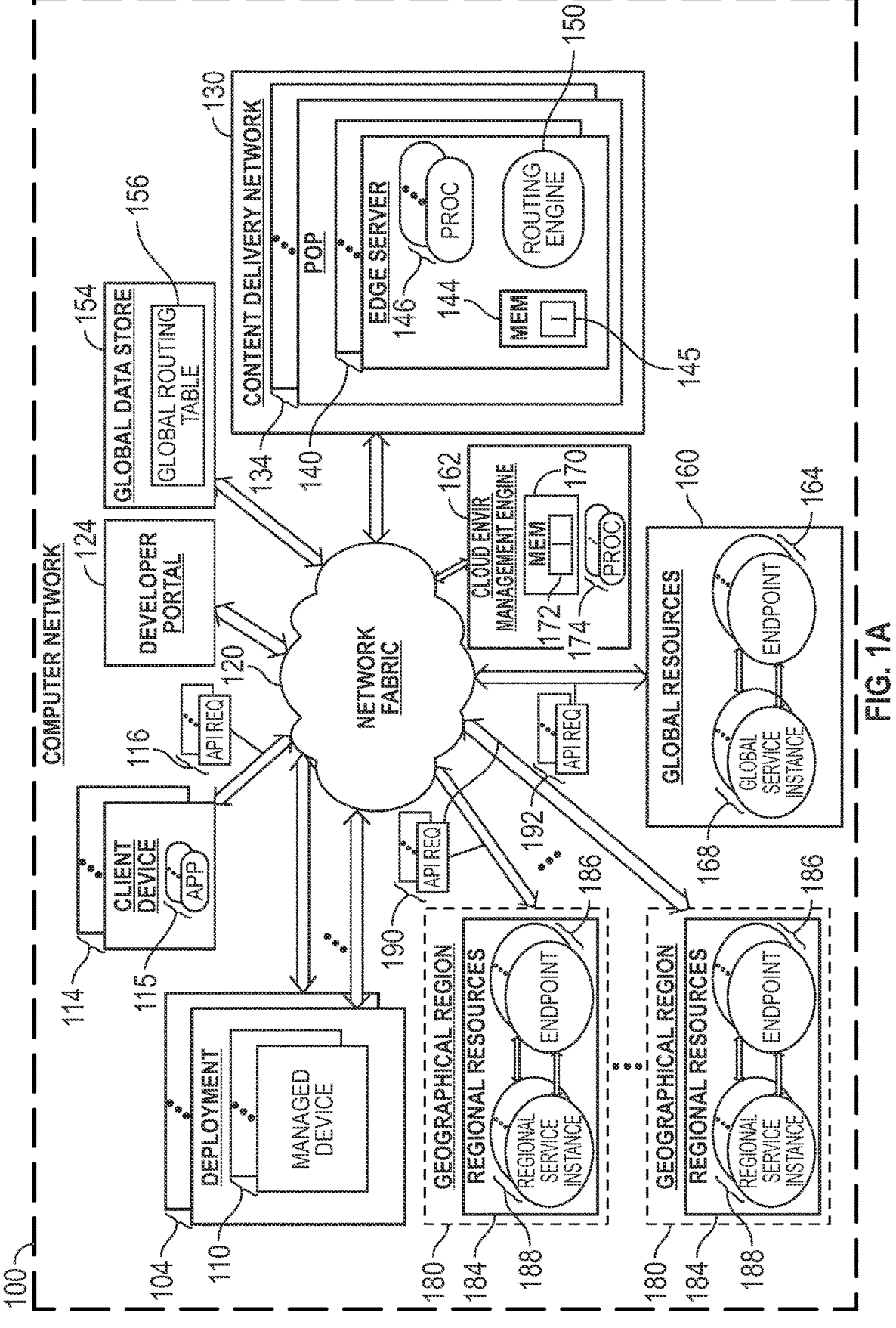
FIG. 1A is a block diagram of a computer network having a content delivery network (CDN) that dynamically routes API requests to global and regional cloud service instances according to an example implementation.

A business enterprise may deploy computing-related workloads to the cloud to take advantage of cloud services for any of a number of reasons. For example, by deploying workloads to the cloud, a business enterprise may avoid the complexities and costs otherwise associated with managing and maintaining an information technology (IT) infrastructure and/or software to process the workloads. As another example, a business enterprise may, on demand, scale a cloud-hosted IT infrastructure up or down to accommodate changing workload sizes. In the cloud, the deployed workload is handled by a cloud service instance.

A cloud service may be regional or global. Cloud service instances for a regional cloud service are hosted in specific geographical zones, or regions, which may be advantageous for customers of the service. For example, a data center may be selected to host a cloud service instance for a particular customer based on the particular geographical region in which the datacenter is located. In an example, the data center may be in the same geographical region as the customer or the customer's devices that are managed by the regional cloud service. A regional cloud service may reduce latencies, satisfy disaster recovery criteria, comply with jurisdictional privacy regulations or otherwise provide a solution that suits a customer's geographical location-related policies. Cloud service instances for a global cloud service are not partitioned according to different geographical zones, or regions.

Developers of applications that consume cloud services may rely on the documentation of example reusable API cloud service calls (or "API calls"). A factor that affects the availability of such documentation for a particular API call is the number of ways that an API call signature can potentially vary to accommodate different use cases. An API call may be in the form of a message, or API request, which includes a message header (among other possible headers) and a payload portion, or body. An API call signature corresponds to the content of the message header and the body. Among its other content, the message header may include data that represents a Uniform Resource Location (URL) (also called a "request URL" herein). The request URL contains information (e.g., a domain name) that identifies the location of an endpoint that hosts an instance of the cloud service.

In one approach, domain name service (DNS)-based routing may be solely relied on to route an API request from a client (e.g., an application instance) to a particular cloud service instance. With this approach, the request URL specifies the location of the endpoint for the cloud service instance. A cloud service provider may provide multiple concurrent instances of a cloud service, which means that there may be a number of potential endpoints (and a corresponding number of potential request URLs). Consequently, if DNS-based routing is solely relied on to route API requests to the cloud service instance endpoints, the corresponding API call signature variability may limit the availability of documented reusable API call examples.

In accordance with example implementations, API requests are communicated between clients (e.g., application instances) and endpoints for cloud service instances using a combination of content delivery network (CDN) routing and DNS routing. The combination of CDN and DNS routing, as described herein, promotes API call signature uniformity. In accordance with example implementations, a client may provide an API request (called a "client-provided API request" herein) that specifies a request URL that contains a domain name that directs, via DNS routing, the API request to a CDN endpoint. In an example, the request URL may specify a domain name that has one part that corresponds to a cloud service provider and an additional subdomain that serves as a geographical service region identifier. For example, a domain name of a request URL may have a format of "<Region>.<Cloud Provider>." Here, "< >" denotes one or multiple domains. For example, "<Cloud Provider>" represents a combination of a top-level domain, a second level domain and possibly one or multiple subdomains corresponding to the cloud service provider. Moreover, "<Region>" represents one or multiple subdomains that identify whether the cloud service is a regional or global cloud service. For a regional cloud service, the subdomain(s) corresponding to "<Region>" further identify the specific geographical service region.

In an example, a subdomain for "<Region>" in a particular request URL may be "global" or a similar text string that represents that the API request is directed to a global cloud service. In another example, a subdomain name for "<Region>" in a particular request URL may be "us_west," "us-west," "uswest" or a similar text string that represents that the API request is directed to a regional cloud service and a specific geographical service region (e.g., a western United States region).

The CDN, in accordance with example implementations, may have points of presence (POPs) that are geographically distributed. One or multiple edge servers may be located at each POP. In an example, in response to a client-provided API request, a DNS server that is associated with the CDN directs the API request to an edge server of the CDN. As a more specific example, the DNS server, in response to a DNS query for an Internet Protocol (IP) address for a certain domain name selects an edge server of the CDN and provides a DNS response containing the IP address of the selected edge server. A routing engine of the selected edge server, in accordance with example implementations, receives and processes the client-provided API request for purposes of routing or forwarding, the client-provided API request to the appropriate endpoint for the cloud service instance. For this purpose, the routing engine, in accordance with example implementations, extracts information from the client-provided API request, which allows the routing engine to look up, from a global routing table, the address of the endpoint of the cloud service instance. The routing engine may then, in accordance with example implementations, generate another API request (called the "CDN-provided API request" herein) that specifies the endpoint address (e.g., a domain name or IP address) for the cloud service instance, as well as other information from the original, client-provided API request. The routing engine sends, via DNS routing, the CDN-provided API request to the cloud service instance endpoint.

In accordance with example implementations, for purposes of looking up the endpoint address for the cloud service instance, the routing engine extracts the following list of elements, or tuple, from the client-provided API request: a geographical service region identifier; a client identifier; and an API call group identifier. The routing engine uses the tuple as an index to the global routing table to identify and read an entry, or record, of the global routing table, which contains the location, or address, of the service instance endpoint.

A cloud service provider may, for a particular cloud service, provide multiple concurrent cloud service instances. In an example, a particular cloud service instance may be a multitenant instance that serves multiple tenants. Here, a "tenant" refers to a user. Tenants of a multitenant service instance may, as examples, be users associated that are with different customer accounts or may be users that are associated with the same customer account. For any of a number of reasons, it may be beneficial for a cloud service provider to move, or migrate, the workload of a particular client from one cloud service instance to another cloud service instance. In an example, for multitenant cloud service instance A, performance issues may arise due to resource contention among multiple clients of instance A. For purposes of resolving a resource contention issue, a cloud environment management engine of the cloud service provider may decide to migrate the workload of a particular client from multitenant cloud service instance A to another cloud service instance D. To change subsequent API request routing for the client, the cloud environment management engine may modify the appropriate record of the global routing table (e.g., write to the appropriate record of the table) to change the service instance endpoint address to the endpoint address for cloud service instance D. As can be appreciated, the endpoint addresses for cloud service instances may be dynamically changed by a cloud service provider in a manner that is transparent to the clients of the instances and which does not affect API call signatures.

FIG. 1A depicts a computer network 100 in accordance with example implementations. Referring to FIG. 1A, a cloud service provider may manage and maintain global resources 160 and regional resources 164 for purposes of providing one or multiple cloud services. More specifically, the global resources 160 may provide one or multiple global cloud service instances 168 (or "global service instances 168"), and each regional resources 164 may provide one or multiple regional cloud service instances 188 (or "regional service instances 188").

In the context that is used herein, a "cloud service instance" (or "service instance") refers to a computing environment that corresponds to an allocation of computing-related resources. In an example, a computing environment may correspond to an actual, physical infrastructure, such as a bare metal machine. In another example, a computing environment may correspond to a virtual infrastructure, such as a virtual machine. In another example, a computing environment may correspond to a combination of virtual and physical infrastructures.

Clients, such as application instances 115, may provide client-provided API requests 116 for purposes of requesting functions, operations or actions related to managing (from the client side) and interacting with the global service instances 168 and regional service instances 188. As described further herein, client-provided API requests 116 are sent, via DNS routing, to a CDN 130 of the computer network 100. In accordance with example implementations, the CDN 130 converts client-provided API requests 116 that are associated with regional service instances 188 into respective API requests 190 (herein called "CDN-provided API requests 190") that, through DNS routing, are directed to the appropriate endpoints 186 for the regional service instances 188. Moreover, in accordance with example implementations, the CDN 130 converts client-provided API requests 116 that are associated with global service instances 168 into respective API requests 192 (herein called "CDN-provided API requests 192") that, through DNS routing, are routed to the appropriate endpoints 164 for the global service instances 168.

In the context that is used herein, an application programming interface, or "API," refers to a collection of software components (e.g., software components associated with a cloud service instance), which collectively provide one or multiple functions, operations or actions. As described herein, an API call is directed to invoking one or multiple functions, operations or actions of a particular API. A cloud service instance may provide a response (an "API response") to an API call. An API call to a cloud service instance may be communicated to cloud service instance in the form of an API request (e.g., a hypertext transfer protocol (HTTP) request or a secure HTTP (HTTPS) request). Moreover, in accordance with example implementations, API requests and API responses may correspond to the Representational State Transfer, or "REST," API call model. In accordance with further implementations, API requests and API responses may correspond to an API call model other than the REST API call model. In accordance with further implementations, API requests and API responses may correspond to a remote procedure call (RPC) model or another API call model.

An API request may be directed to invoking any of a number of different actions or functions, operations of actions by a cloud service instance, depending on the underlying cloud service that is offered through the instance and the particular APIs of the instance. In an example, for a cloud service instance that is associated with a network management system (NMS) service, an API request may be related to an operation to configure a network device with parameters corresponding to a particular network telemetry reporting subscription. In another example, an API request to an NMS cloud service instance may be related to an operation to update firmware of a network device. In another example, an API request to an NMS cloud service instance may be related to an operation to configure a network device. In another example, for a cloud service instance that is associated with a compute operations (or "compute ops") service, an API request may be directed initiating a firmware package upgrade for a managed server. In another example, an API request to a compute ops service instance may be related to, initiating the installation of an operating system on a managed server, or another operation. In another example, for a cloud service instance associated with a backup and recovery service, an API request may be directed to initiating backup of a particular storage volume. In other examples, depending on the particular underlying cloud service, API requests may be directed to functions, operations, or actions related to machine learning processing, network configuration, sales management, human resource management, big data analyses, big data mining, accounting, identity and access management, docketing customer relationship management, database operations, cloud service management, high performance computing (HPC), as well as other functions, operations or actions.

A client-provided API request 116 may be generated by any of a number of different entities and in any of a number of different ways, depending on the particular implementation. In the context that is used herein, a "client" refers to an entity that generates an API request. The client may have one of many different forms. In an example, a client may be an application instance 115 that executes on a client device 114 (e.g., a computer platform, such as a laptop computer, a desktop computer, tablet computer, a smartphone, a wearable computer or a network device). In an example, for a cloud service instance that corresponds to a Software-as-a-Service (SaaS) cloud service model, the client may be an Internet browser instance (e.g., an Internet browser instance having a particular plug-in or executing a particular script to generate the API requests 116). In another example, a client may be an application instance 115 that is provided by a cloud service provider and dedicated to providing API requests 116 for purpose of interfacing with cloud service instances. In another example, a client may correspond to an API platform application that builds and generates API requests. In another example, a client may be a developer web-based portal 124 that builds, generates and tests API requests. In another example, a client may be an operating system (e.g., an operating system hosted on a client device 114), and the API requests 116 may generated in response to commands (e.g., a curl command for a LINUX operating system) that are provided to the operating system through a shell or script. In another example, a client may be microservice (e.g., a microservice provided by a cluster of container pods hosted on a client device 114).

In the context that is used herein, an "endpoint" for a cloud service instance refers to a network-addressable communication interface that is associated with the cloud service instance. In an example, the endpoint may be virtual (e.g., an endpoint provided via a virtual service mesh gateway or a virtual network device). In another example, the endpoint may correspond to a physical hardware component (e.g., an actual, or physical, network device). In an example, the endpoint may be an API endpoint that is dedicated to receiving API requests that are directed to an associated cloud service instance. An endpoint has an associated location, or address. In an example, an address of an endpoint may be an IP address. A domain name, which a DNS associates with an IP address, is another example of an address of an endpoint.

In the context that is used herein, a "domain name" refers to a string of human-readable text that is associated with an IP address. The string includes a concatenation of domains that are ordered according to a DNS hierarchy and are separated by a "." delimiter. A domain name, in general, includes a top-level domain, a second level domain and zero, one or multiple other domains that may be referred to as "subdomains." The DNS hierarchical ordering is indicated in a right to left direction of the domain name.

For purposes of generating a CDN-provided API request 190 or 192 from a client-provided API request 116, the CDN 130 extracts information from the API request 116, which serves as an index value for use with a global routing table 156 of a global data store 154. In this manner, in accordance with example implementations, the index value identifies a specific entry, or record, of the global routing table 156, and the CDN 130 reads data from the identified record, which represents an endpoint location for the cloud service instance that corresponds to the API request 116. The CDN 130 may then generate a request URL for the routing engine-provided API request 190 or 192, which contains the endpoint location.

In accordance with example implementations, components of the computer network 100, such as client devices 114 that host cloud service clients (e.g., applications 115), the CDN 130, the global resources 160 and the regional resources 184, may be interconnected by network fabric 120. In accordance with example implementations, the network fabric 120 may be associated with one or multiple types of communication networks, such as (as examples) Fibre Channel networks, Compute Express Link (CXL) fabric, dedicated management networks, local area networks (LANs), WANs, global networks (e.g., the Internet), wireless networks, or any combination thereof.

As depicted in FIG. 1A, in accordance with example implementations, the regional resources 184 may be located in different geographical service regions 180 (also called "geographical regions" herein). Geographically partitioning resources into different geographical service regions for a particular cloud service may be beneficial for any of a number of reasons. In an example, as depicted in FIG. 1A, a regional cloud service may manage devices 110 of a particular deployment 104. In an example, a particular deployment 104 may be a group of managed servers 110 that are located in or near one of the geographical regions 180. For this example, the servers 110 may be managed using a regional cloud service, such as a compute operations (or "compute ops") cloud service. The compute ops service may, for example, manage the installation of firmware package upgrades on the servers or manage operating system installations on the servers. It may be advantageous for regional resources 184 that hosts compute ops service instances to be in the same or nearby time zone of the servers 110 for such reasons as coordinating scheduled maintenance windows with server down times.

In another example, the managed devices 110 for a particular deployment 104 may be a group of network devices that are located in or near one of the geographical service regions 180. For this example, the network devices 110 may be managed using a network management system (NMS) cloud service. For example, example, instances of the NMS cloud service may monitor network telemetry metrics that are reported by the network devices 110, perform ongoing network performance analyses or perform other management functions. It may be advantageous, for regional resources 184 that host NMS service instances to be geographically close to the managed network devices 110 for a variety of reasons, such as enhancing the responsiveness of the NMS service to changing network conditions and enhancing telemetry metric reporting.

As compared to a regional cloud service, a global cloud service does not generally benefit from geographic restrictions being placed on its hosting resources. In an example, global resources 160 may host global service instances 168 related to identity and access management (IAM) for cloud resources. In other examples, global resources 160 may host global service instances 168 related to managing user accounts and subscription-related information for a compute ops or NMS service.

In the context that is used herein, a "resource" (also called a "computing-related resource" herein) refers to a virtual or physical component that supports a computing environment. In examples, a resource may be a computer platform (e.g., a blade server or rack server) or a partition of a computer platform (e.g. multiple nodes of a particular server associated with different operating system instances). In another example, a resource may be a hardware component, such as a memory device, a central processing unit (CPU) core, graphics processing unit (GPU) core, trusted platform module (TPM), a baseboard management controller (BMC), a smart input/output (I/O) peripheral (or "data processing unit," or "DPU"), expansion card, I/O bridge, security interposer device, a storage controller, a storage device, a cache or bus controller. In other examples, a resource may be a software, such as an operating system, a hypervisor, a middleware, utility program, an application, or firmware. In other examples, a resource may be a virtualization technology component, such as a container management engine, a container, a container pod, a cluster of container pods, a network virtualization layer, a storage virtualization layer, a virtual machine, a hypervisor, a virtual TPM or a virtual BMC. In other examples, a resource may be a physical file system, a virtual file system, a hybrid file system, or a network file system. In another example, a resource may be a database. In another example, a resource may be a micro-service.

A cloud service instance (e.g., a global service instance 168 or a regional service instance 188) may correspond to any of a number of cloud service models. In an example, a cloud service instance may correspond to an Infrastructure-as-a-Service (IaaS) cloud service model, in which a cloud service provider provides an infrastructure (e.g., compute, virtualization management, storage and networking components) for a computing environment, and the customer is responsible for providing and managing non-infrastructure resources of the computing environment, such as virtual machines, containers, middleware, an operating system, applications and data. In another example, a cloud service instance may correspond to the SaaS cloud service model, in which a cloud service provider provides and manages a particular application, including providing and managed the entire application stack and supporting infrastructure of the computing environment. In another example, a cloud service instance may correspond to a Platform-as-a-Service (PaaS) cloud service model, in which a cloud service provider provides and manages an infrastructure and supporting software of a computer environment that is designed for the development of applications by the customer. In other examples, a cloud service instance may correspond to another cloud service model, such as a Container-as-a-Service (CaaS) cloud service model or a Desktop-as-a-Service (Daas) cloud service model.

The global resources 160 and the regional resources 184 may be physically located in any of a number of different computing facilities. In an example, the global resources 160 may be located in one or multiple data centers (e.g., a single data center, multiple data centers in the same availability zone, or multiple data centers distributed across multiple availability zones). In an example, the regional resources 184 for a particular geographical service region 180 may be located in one or multiple data centers within the geographical service region 180 (e.g., a single data center in the geographical service region 180, multiple data centers in the same availability zone within the geographical service region 180, or multiple data centers distributed across multiple availability zones within the geographical service region 180).

In accordance some implementations, the computer network 100 may be associated with a public cloud. In this manner, a cloud service provider may maintain and manage the global resources 160 and the regional resources 184 for purposes of providing cloud service instances over the Internet to subscribing members of the general public. Moreover, in an example, the global resources 160 and the regional resources 184 may be owned by the cloud service provider.

In accordance with further implementations, the computer network 100 may be associated with a private cloud. In an example, a business enterprise may own the global resources 160 and the regional resources 184, and the business enterprise may serve as a provider for purposes of managing and maintaining the global resources 160 and the regional resources 184 to provide service instances for the business enterprise's own use. In another example, the global resources 160 and regional resources 184 may be located in leased spaces of co-location data center(s), and the business enterprise may serve as a provider of service instances for the business enterprise's own use. In another example, a cloud service provider other than a business enterprise may own the global resources 160 and the regional resources 184, and the cloud operator may manage and maintain the global resources 160 and the regional resources 184 for purposes of providing cloud service instances for the business enterprise. In another example, a cloud service provider other than a business enterprise may own and maintain the global resources 160 and the regional resources 184, and the global resources 160 and the regional resources 184 may be located on properties owned or leased by the business enterprise. Moreover, for this example, the cloud service provider may manage and maintain the global resources 160 and the regional resources 184 for purposes of providing cloud service instances for the business enterprise.

In accordance with further implementations, the computer network 100 may be associated with a cloud other than a public cloud or a private cloud. In an example, the computer global resources 160 and the regional resources 184 may correspond to a community cloud, which provides cloud services for members of a particular community group or members sharing a common interest. In another example, the global resources 160 and the regional resources 184 may correspond to a hybrid cloud, which is a mixture of two or more of a private cloud, public cloud and community cloud.

A "content delivery network," or "CDN," in the context that is used herein, refers to a geographically distributed infrastructure that enhances communication between servers and clients of the servers. For the example implementation that is depicted in FIG. 1A, CDN enhances communication between cloud service instances (which may be considered servers) and the clients of the cloud service instances. In example implementations that are described herein, the CDN 130 enhances communication by performing dynamic routing of client-provided API requests. The CDN 130 may enhance communications between servers and clients of the servers in one or multiple additional ways, in accordance with example implementations. In an example, the CDN 130 may cache frequently-provided static content from servers (e.g., service instances) for purposes of offloading overhead from the servers as well as reducing the latencies otherwise incurred in delivering the content to clients. In another example, the CDN 130 may employ one or multiple measures (e.g., relatively high bandwidth connections with the servers and predictive prefetching of data from the servers) that enhance the delivery of dynamic data from the servers (e.g., service instances) to the clients.

The CDN 130, in accordance with example implementations, has edge servers 140 that are geographically distributed at different points of presence (POPs) 134. In this manner, as depicted in FIG. 1A, one or multiple edge servers 140 may be located at a particular POP 134. An "edge" designation for the server 140 refers to the server being located in the network edge. In this context, the "network edge" refers to a portion of a network (e.g., the computer network 100) that is associated with entry points to the network. A local branch network (e.g., a local area network (LAN)) is an example of a network edge. In accordance with example implementations, the edge servers 140 may be geographically distributed in branch networks that contain the client devices 114, so that each client device 114 is geographically near a particular POP 134 and the POP's edge servers 140.

The CDN network 130, in accordance with example implementations, is associated with a DNS server that, in response to DNS queries for certain domain names, provides IP addresses that correspond to the edge servers 140. In an example, the DNS server, in response to a request URL containing a certain domain name (e.g., a domain name in the format of "<Region>.<Cloud Provider>") selects an edge server 140 and provides a DNS response containing the IP address of the selected edge server 140. The DNS server's selection of the particular edge server 140 may be based on any of a number of criteria, such as one or more of the number of hops from the edge server 140 to the client, the geographical location of the edge server 140, a transient time for communications between the edge server 140 and the client, the loads of all edge servers 140 associated with a particular POP 134, or other criteria.

Regardless of how an edge server 140 is selected for purposes of handling a particular client-provided API request 116, a routing engine 150 of the selected edge server 140, in accordance with example implementations, receives and processes the client-provided API request 116 for purposes of routing or forwarding, the client-provided API request 116 to the appropriate cloud service instance endpoint. More specifically, the routing engine 150, in accordance with example implementations, extracts information from a client-provided API request 116, which allows the routing engine 150 to look up, from the global routing table 156, the address of the endpoint of the cloud service instance. The routing engine 150 may then, in accordance with example implementations, generate a CDN-provided API request (e.g., the API request 190 or 192) that specifies the endpoint address (e.g., a domain name or IP address) for the cloud service instance, as well as other information from the original client-provided API request 116. The routing engine 150 sends, via DNS routing, the CDN-provided API request to the cloud service instance endpoint.

In accordance with example implementations, the routing engine 150, for purposes of routing a client-provided API request 116, processes the request 116 to extract a geographical service region identifier (also called a "geographical region identifier" herein), an API call group identifier, and a client identifier from the request 116. The geographical service region identifier represents whether the client-provided API request 116 is directed to a global or regional cloud service instance, and for a regional cloud service instance, the geographical service region identifier further identifies the specific geographical service region. The API call group identifier represents a category, or classification, of the underlying API call (e.g., a compute ops management API call group, a device management API call group or a backup and recovery API call group). The client identifier identifies the client that generated the client-provided API request 116.

In accordance with example implementations, the geographical service region identifier corresponds to a subdomain (e.g., a subdomain corresponding to "<Region>") of the domain name (e.g., a domain name having the format of "<Region>.<Cloud provider>") that is specified by the request URL of the client-provided API request 116. In an example, the geographical service region identifier for a global cloud service instance may be "global," and a client-provided API request 116 that is directed to a global service instance 168 includes a request URL that specifies the following domain name: "global.<Cloud Provider>".

In another example, client-provided API requests 116 that are directed to regional cloud service instances have subdomains in their respective request URLs, which identify the appropriate geographical service regions 180. In an example, a regional geographical service region identifier for a western region of the United States may be a subdomain of "us-west." Continuing the example, a client-provided API request 116 that is directed to a regional service instance 188 located in the western United States geographical service region may include a request URL that specifies the following domain name: "us-west.<Cloud Provider>".

The API call group identifier, in accordance with example implementations, is specified in a resource path of the request URL of the client-provided API request 116. In an example, a request URL may contain the following content: "<Region>.<Cloud Provider>/<API Group>". Here, "<API Group>" represents an API call group identifier. In an example, the API call group identifier may be a string of human-readable text that corresponds to a particular cloud service. In an example, for API calls for a network device management cloud service, "devices," "device-mngmt" or another descriptive text string may be used as an API call group identifier and be included as a part of the resource path of the request URL. For example, the request URL may contain the following: "<Region>.<Cloud Provider>/devices . . . ." In an example, for API calls for an identity and access management (IAM) cloud service, "iam," "id&access-mngmt," or another descriptive text string may be used as an API call group identifier and be included as a part of the resource path of the request URL. In an example, for API calls for networking cloud services, "network," "networking" or another descriptive text string may be used as an API call group identifier and be included as a part of the resource path of the request URL. In an example, for API calls for backup and recovery cloud services, "b&r," "backup-recovery" or another descriptive text string may be used as an API call group identifier and be included as a part of the resource path of the request URL.

The resource path of the URL may, in accordance with example implementations, may contain content that represents one or multiple subcategories of an API call group. In an example, a request URL may contain the following content: "<Region>.<Cloud provider>/<API Group>/<Subgroup>", where "<Subgroup>" represents a text string or other identifier (e.g., a number or alphanumeric identifier containing numbers and letters) that corresponds to an API call subgroup. In an example, "topology" or a similar text string may represent a subgroup of API calls for a networking service, which are directed to a network topology. In an example, "version-one," "V1," or a similar text string may represent a particular version of API calls for an API call group. In another example, a request URL may contain the following content: "<Region>.<Cloud Provider>/<API Group>/<subgroup-1> . . . /<subgroup-n>", where "<subgroup-n>" corresponds to the nth subgroup of n subgroups of an API call group. In an example, a request URL for a networking service-related API that is directed to version one and directed to topology may contain the following content: "<Region>.<Cloud Provider>/v1/topology".

The client identifier, in accordance with example implementations, is represented by an authentication bearer token (ABT) of the client-provided API request 116. An ABT, in general, is a value that is assigned by a server to a client responsive to the client requesting access to protected resources controlled by the server. A server hosting a cloud service instance or otherwise associated with regulating access to the cloud service instance may assign an ABT to a client after the server authenticates the client. The client may then include the ABT in API requests, such as the client-provided API requests 116, for purposes of gaining access to the cloud service instance through API calls. In accordance with example implementations, the server that provides the ABT token, injects a client identifier into the ABT token. As its name implies, a client identifier specifically identifies the client providing the API request 116.

A server may inject a client identifier into an ABT token in any of a number of different ways. In an example, a server may inject a client identifier into an ABT token by concatenating a token value (e.g., a randomly-generated or pseudorandomly-generated value) and the client identifier to form the ABT. In another example, the ABT may be a JavaScript Object Notation (JSON) web token, or "JWT," and the server may embed the client identifier in a payload of the JWT. Regardless of how the client identifier is injected into the ABT, the routing engine 150 has knowledge regarding how to extract the client identifier from the ABT.

Figure 1B:
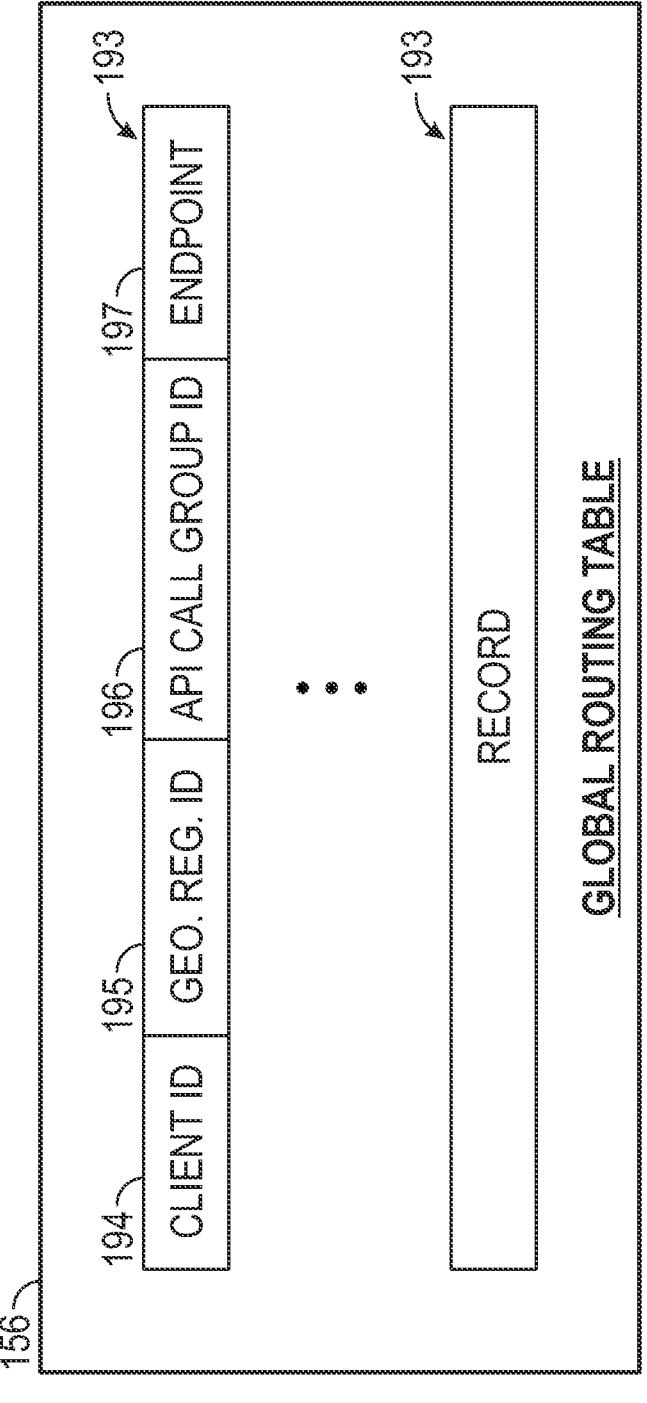
FIG. 1B is an illustration of a global routing table of FIG. 1A according to an example implementation.

FIG. 1B depicts an example global routing table 156 in accordance with example implementations. Referring to FIG. 1B in conjunction with FIG. 1A, in the context used herein, the table 156 being "global" refers to the table 156 being accessible by an entity, regardless of the geographical location of the entity. Routing engines 150 may access the global routing table 156 for purposes of determine endpoint locations of cloud service instances, and moreover, as described herein, the global routing table 156 may be accessed and updated by a cloud environment management engine 162, a cloud service manager, for purposes dynamically changing the CDN routing of API requests.

The global routing table 156 includes entries, or records 193. Each record 193 is associated with a particular cloud service instance and sets forth the location, or address, of the endpoint for the cloud service instance. More specifically, in accordance with example implementations, the record 193 includes three fields that serve as a tuple-based index to uniquely identify the record 193: a field 194 that contains data representing a client identifier; a field 195 that contains data representing a geographical service region identifier; and a field 196 that contains data representing an API call group identifier. The record 193 further contains a field 197 that contains data that represents a location, or address, of the endpoint for the cloud service instance that corresponds to the client identifier, the geographic service region identifier and the API call group identifier. In examples, the location, or address, of the endpoint may be a domain name or an IP address.

A routing engine 150 may determine an endpoint address for a cloud service instance as follows. The routing engine 150 may first read data from the global routing table 156 for purposes of identifying a particular record 193 of the table 156, which corresponds to a client identifier, a geographical service region identifier and an API call group identifier, which were extracted from the client-provided API request 116. The routing engine 150 may then read data from the endpoint field 197 of the identified record 193, which represents the endpoint address.

In accordance with example implementations, the global routing table 156 may be updated by the cloud environment management engine 162 to dynamically change the mapping between clients and corresponding cloud service instances. In accordance with example implementations, a (client identifier, geographical service region identifier, API call group identifier) tuple maps to a single cloud service instance. Moreover, in accordance with example implementations, a particular cloud service instance may be a multitenant instance. Therefore, multiple different (client identifier, geographical service region identifier, API call group identifier) tuples may map to the same cloud service instance.

The cloud environment management engine 162 may determine to switch the workload of a particular client from one cloud service instance to another. To effect this change from an API request routing perspective, the cloud environment management engine 162 may update the corresponding record 193 of the global routing table 156 by writing to the field 197 to replace the endpoint address associated with the old cloud service instance with the endpoint address associated with the new cloud service instance. Because the cloud service provider is able to control the CDN-based API routing in this manner, clients are agnostic to the endpoint locations of the cloud service instances, and moreover, changing the CDN routing does not affect the content of the client-provided API requests 116.

In the context that is used herein, a "workload" generally refers to information that is associated with a client. In an example, a workload may include a set of computing system-related jobs or tasks (e.g., compute, networking, storage or database-related operations) to be processed by a cloud service instance. In another example, a workload may include configurations associated with a client. In another example, a workload may include data associated with a client. In another example, a workload may correspond to tasks, data and configurations associated with the execution of an application. In another example, a workload may correspond to a database associated with the client. In another example, a workload may correspond to tasks, data and configurations associated with developing an application. In another example, a workload may correspond to tasks, data and configurations associated with a virtualized environment, such as a virtual machine, a container, a container pod, or a cluster of container pods. In another example, a workload may correspond to management-related tasks, data and configurations, such as tasks, data and configurations related to managing a group of servers or managing a group of network devices. In another example, a workload may correspond to HPC tasks and the related data and configurations.

Referring back to FIG. 1A, in accordance with some implementations, the edge server 140 includes one or multiple hardware processors 146 and a memory 144. In an example, a hardware processor 146 may include one or multiple central processing unit (CPU) cores and/or one or multiple graphical processing unit (GPU) cores. In another example, a hardware processor 146 may include one or multiple semiconductor CPU packages (or "sockets"). In another example, a hardware processor 146 may include one or multiple GPU packages.

The memory 144, as well as other memories of the computer network 100, includes non-transitory storage media that may be formed from semiconductor storage devices, memristor-based storage devices, magnetic storage devices, phase change memory devices, a combination of devices of one or more of these storage technologies, and so forth. The memory 144 may represent a collection of memories of both volatile memory devices and non-volatile memory devices.

In an example a hardware processor 146 may execute machine-readable instructions, such as machine-readable instructions 145 that are stored in the memory 144, for purposes of providing one or multiple software components of the edge server 140, such as the routing engine 150. In accordance with further implementations, a hardware processor 146 may be a hardware circuit that does not execute machine-executable instructions, such as an application specific integrated circuit (ASIC), field programmable gate array (FPGA), programmable logic device, a programmable logic device (PLD), or other hardware dedicated to providing one or multiple functions for the edge server 140.

in accordance with some implementations, the cloud environment management engine 162 may be hosted on a server. The server may, for example, include one or multiple hardware processors 174 and a memory 170. In an example, a hardware processor 174 may include one or multiple CPU cores and/or one or multiple GPU cores. In another example, a hardware processor 174 may include one or multiple CPU sockets and/or one or multiple GPU packages.

In an example a hardware processor 174 may execute machine-executable instructions, such as machine-readable instructions 172 that are stored in the memory 170, for purposes of providing the cloud environment management engine 162. In another example, a hardware processor 174 may be a hardware circuit that does not execute machine-executable instructions, such as an ASIC, an FPGA, a PLD, or other hardware.

In the context that is used herein, a "network device" refers to an actual, or physical electronic component, which enables data communication between other components. In an example, a network device may be a switch that operates at level two (L2) of the Open Systems Interconnection (OSI) model to connect components of a computer network together. In another example, a network device may be a level three (L3) switch that connects both components of a computer network together and connects computer networks together. In other examples, a network device may be a gateway, a multicast router, a bridge, a component of a Gen-Z or a CXL network, a processor device, a network interface controller (NIC) or a fabric switch that includes one or multiple of the foregoing devices. A network device may be a wired or wireless device.

Figure 2A:
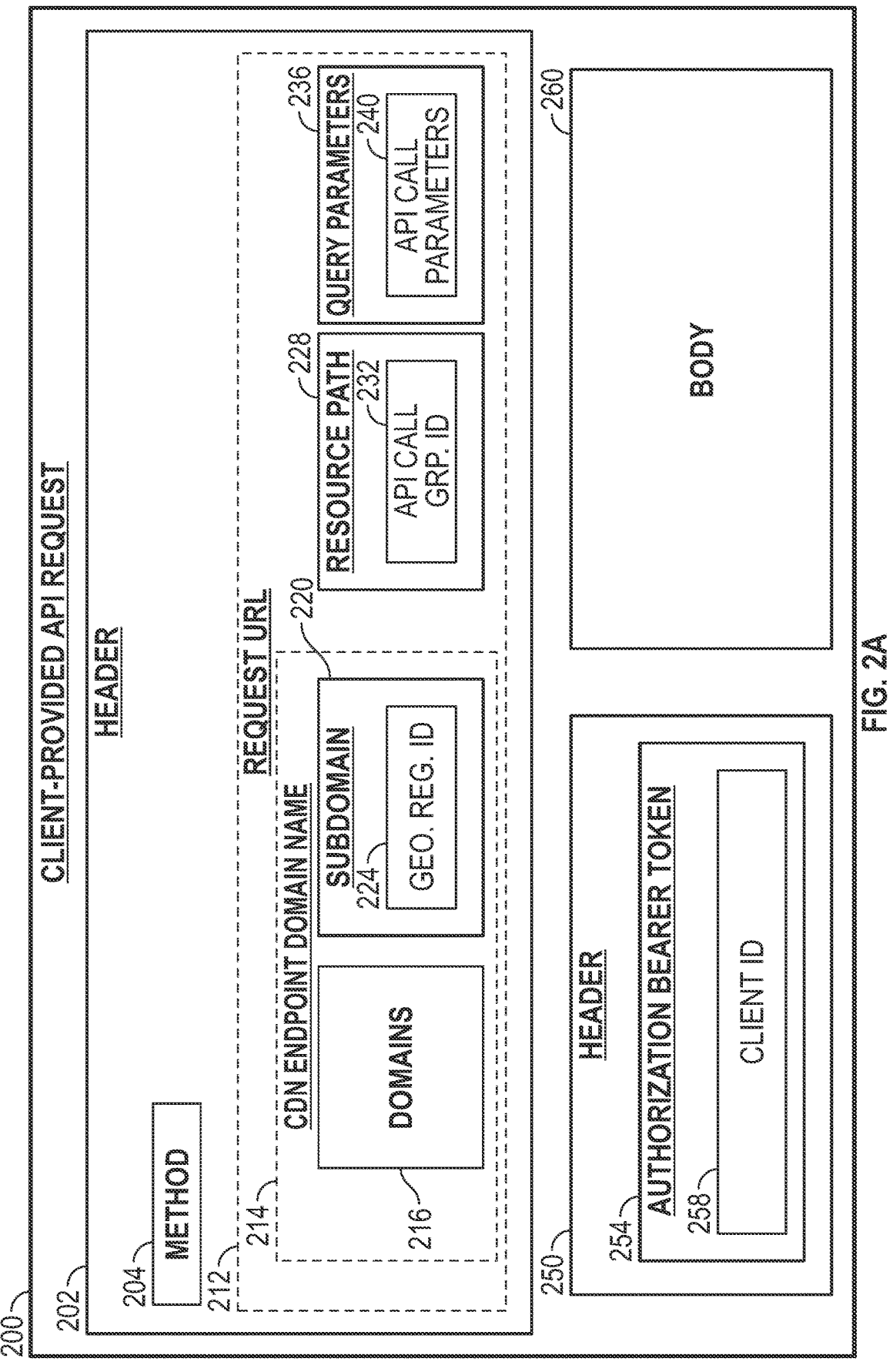
FIG. 2A is an illustration an API request that is provided by a client according to an example implementation.

FIG. 2A is an illustration of a client-provided API request 200 in accordance with example implementations. The client-provided API request 200 is a more specific example of the client-provided API request 116 discussed above in connection with FIG. 1A. Referring to FIG. 2A, in accordance with example implementations, the client-provided API request 200 includes a message header 202 and a body 260. In an example, the message header 202 includes data that represents a method 204 and data that represents a request URL 212.

The method 204 specifies an operation. In examples, for a REST API, the method may specify a Get, Post, Put, Patch, Delete or other operation. The request URL 212 includes a CDN endpoint domain name 214. As described herein, the CDN endpoint domain name 214, in general, through DNS routing directs the client-provided API request 200 to an edge server of a CDN, such as the CDN 130 of FIG. 1A. The CDN endpoint domain name 214 may contain domains 216 that designate the client-provided API request 200 as being affiliated with an API call and being affiliated with a particular cloud service provider.

The CDN endpoint domain name 214 may further include a subdomain 220 that corresponds to a particular geographical service region identifier 224. In an example of a client-provided API request 200 that is directed to a regional service instance, a CDN endpoint domain name 214 may be in the format "<Specific Geographical Region>.<Cloud Provider>," where "<Specific Geographical Region>" represents one or multiple domains that correspond to a specific geographical service region. In an example of a client-provided API request 200 that is directed to a global service instance, a CDN endpoint domain name 214 may be in the format "<Global>.<Cloud Provider>," where "<Global>" represents one or multiple domains that designate the global cloud service.

The request URL 212 further includes a resource path 228. The resource path 228 may specify an API call group identifier 232. Moreover, the resource path 228 may specify one or multiple API call subgroups. The resource path 228, in accordance with example implementations, may further include one or multiple parts that designate resources operated on or accessed by the underlying API call. The request URL 212 may further specify one or multiple query parameters 236. In an example, the query parameter(s) 236 may include one or multiple API call parameters 240 that are specific to the underlying API call. In an example, the API call parameter(s) 240 may specify one or multiple resource selection criteria, which are specific to the underlying API call.

The client-provided API request 200 may include one or multiple headers other than the message request header 202. As depicted in FIG. 2, in accordance with example implementations, the client-provided API request 200 includes a header 250 that contains data that represents an ABT 254. Moreover, the ABT 254, in accordance with example implementations, includes an injected subset of data that represents a client identifier 258. Because the header 250 is not part of the message request header 202, the inclusion of the ABT 254 in the header 250 does not alter a signature associated with the client-provided API request 200.

Among its other features, the client-provided API request 200 may include a body 260. The content of the body 260 may depend on the particular underlying API call. In an example, for a method 204 operation of Post or Put, the body 260 may contain payload data for the operation. In another example, the body 260 may contain data that specifies a format for data to be returned in a corresponding API response. In another example, the body 260 may specify one or multiple parameters for the underlying API call.

Figure 2B:
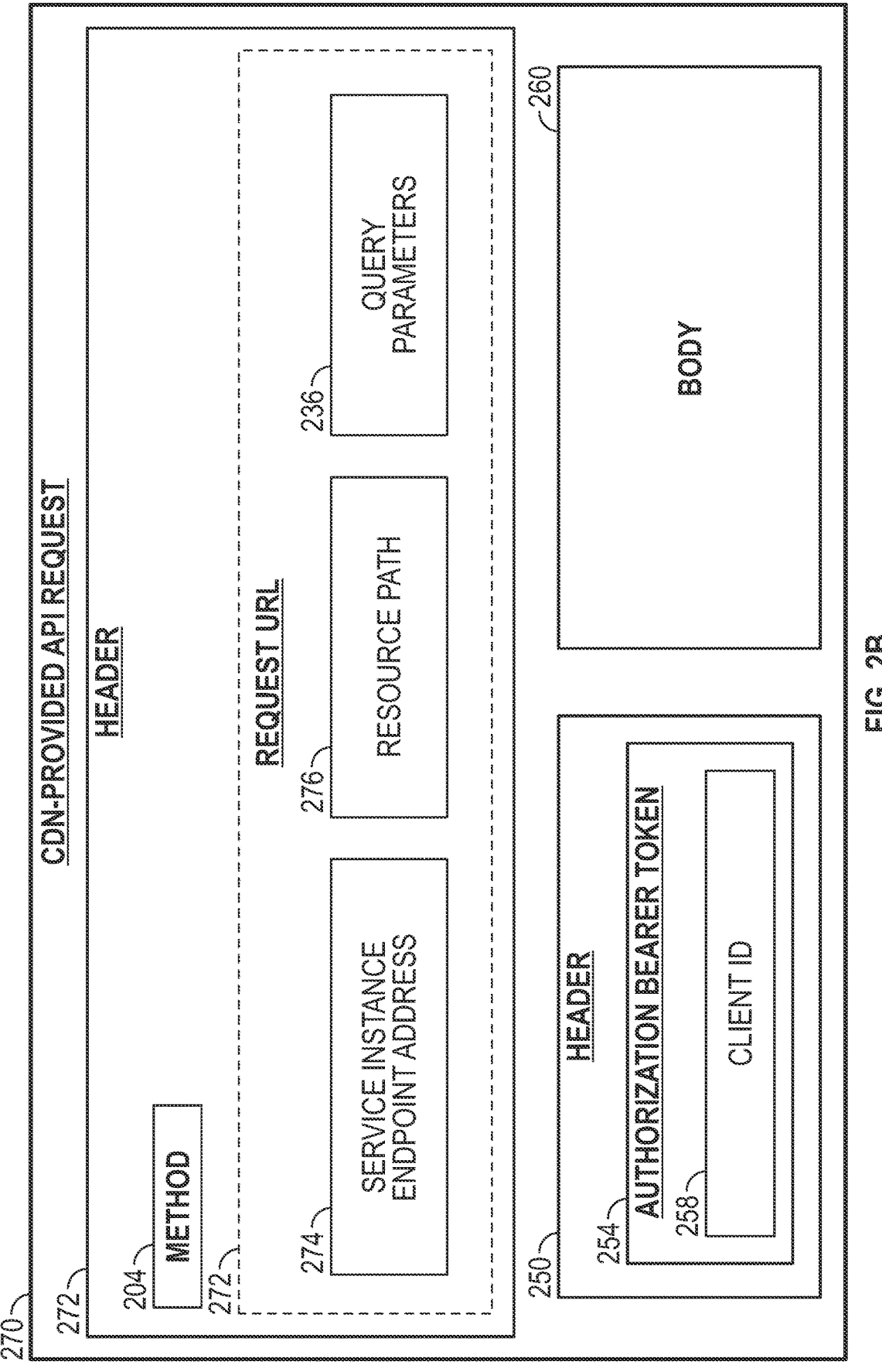
FIG. 2B is an illustration of an API request that is provided by a CDN in response to a client-provided API request according to an example implementation.

FIG. 2B is an illustration of a CDN-provided API request 270, in accordance with example implementations. The CDN-provided API request 270 is a more specific example of the CDN-provided API request 190 or 192 discussed above in connection with FIG. 1A. Referring to FIG. 2B in conjunction with FIG. 2A, in accordance with example implementations, the CDN-provided API request 270 has information that is carried over from the corresponding client-provided API request 200. In an example, the CDN-provided API request 270 contains data representing the method 204, query parameters 236, authorization bearer token 254 and body 260 from the corresponding client-provided API request 200.

In addition to containing data representing the method, a message request header 272 of the CDN-provided API request 270 includes a request URL 272, which differs from the request URL 212 of the client-provided API request 200. In particular, the request URL 272 specifies a service instance endpoint address 274. In this manner, the service instance endpoint address 274 may be derived from a global routing table, such as the global routing table 156 of FIG. 1B. In an example, the service instance endpoint address 274 may be a domain name. In another example, the service instance endpoint address 274 may be an IP address.

A resource path 276 of the request URL 272 of the CDN-provided API request 270, in accordance with example implementations, includes information that is carried over from the resource path 228 of the client-provided API request 200. In an example, the resource path 276 is identical to the resource path 228. In another example, the resource path 276 is identical to the resource path 228, except for certain items being removed (e.g., the API call group identifier).

Figure 3:
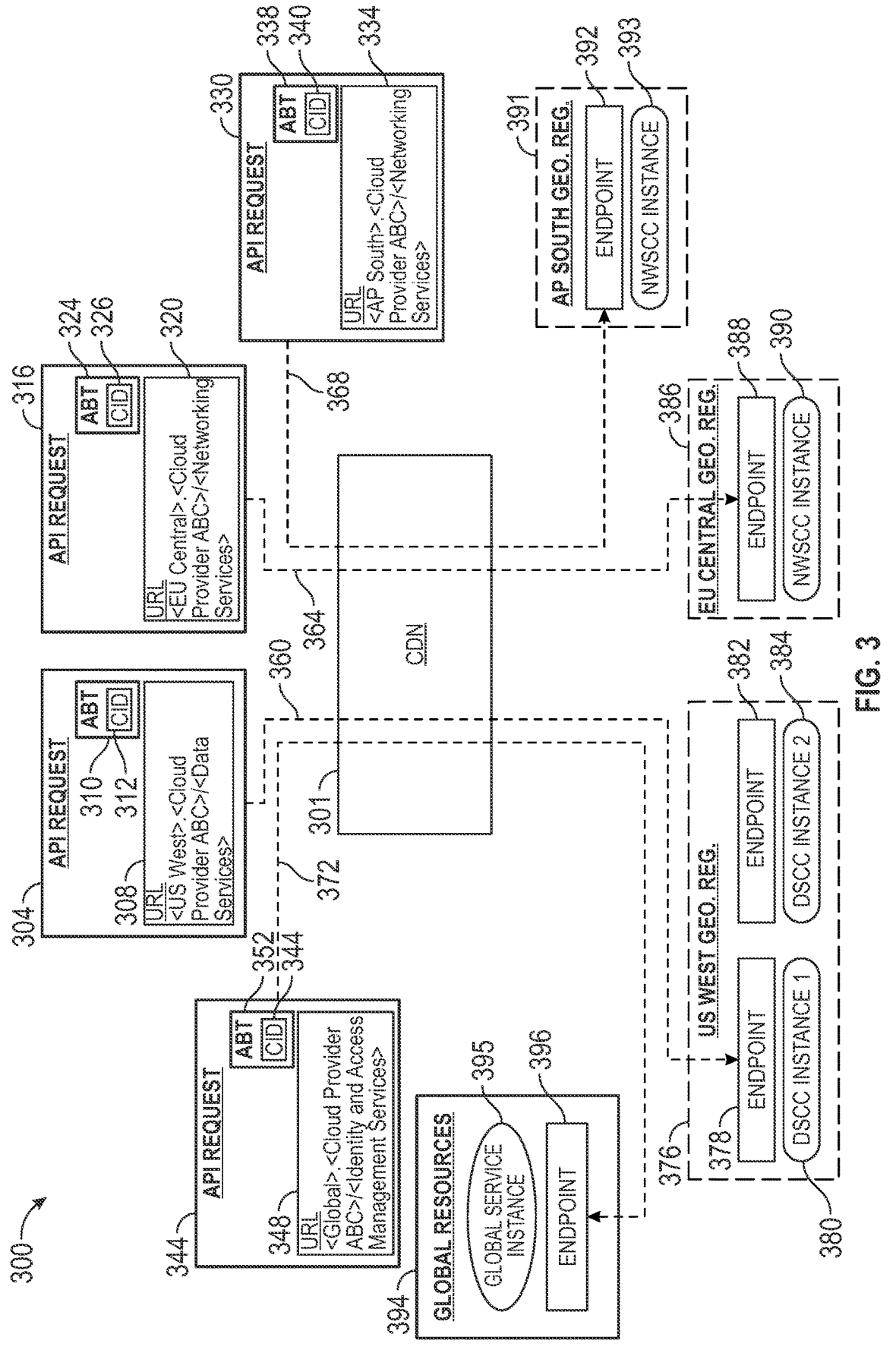
FIG. 3 is an illustration of the routing of API requests by a CDN according to an example implementation.

FIG. 3 is an illustration 300 of CDN-based routing of API requests in accordance with example implementations. Referring to FIG. 3, example client-provided API requests 304, 316, 330 and 344 are routed, via DNS routing, to a CDN 301. In an example, the CDN 301 may have the same or similar features of the CDN 130 of FIG. 1A. The CDN 301 routes the client-provided API requests 304, 316, 330 and 344 to endpoints 378, 388, 392 and 396, respectively, for corresponding cloud service instances. Although not depicted in FIG. 3, as described herein, the routing of client-provided API requests by the CDN 301 involves generating corresponding CDN-provided API request that are sent from the CDN 301 to the cloud service instances.

The client-provided API request 304 contains a request URL 308 containing content in the format of "<US West>.<Cloud Provider ABC>/<Data Services>". For this example, "<US West>" represents one or multiple domains that correspond to a western United States geographical service region 376; "<Cloud Provider ABC>" represents one or multiple domains that correspond to a particular cloud service provider; and "<Data Services>" represents one or multiple domains that correspond to a group of data service-related API calls. The client-provided API request 304 further includes an ABT 310 with an injected client identifier 312. Based on the client identifier 312, the "<US West>" geographical service region identifier and the "<Data Services> API call group identifier, the CDN 301 routes the client-provided API request 304 to the endpoint 378, as represented by routing path 360. In this context, "routing" a client-provided API request (e.g., the API request 304) to an endpoint (e.g., the endpoint 378) includes modifying the client-provided API request to provide a CDN-provided API request, as described herein.

For this example, the endpoint 378 corresponds to a data services cloud computing (DSCC) instance 380, a cloud service instance, which is hosted by resources located in the western United States geographical service region 376. FIG. 3 further depicts another data services cloud computing instance 382 of the western United States geographical service region 376, which is associated with an endpoint 382 and is not assigned, or mapped, to the client identifier 312.

The client-provided API request 316 contains a request URL 320 containing content in the format of "<EU Central>.<Cloud Provider ABC>/<Networking Services>". For this example, "<EU Central>" represents one or multiple domains that correspond to a central Europe geographical service region 386, and "<Networking Services>" represents one or multiple domains that correspond to a group of network service-related API calls. The client-provided API request 316 further includes an ABT 324 with an injected client identifier 326. Based on the client identifier 326, the "<EU Central>" geographical service region identifier and the "<Networking Services> API call group identifier, the CDN 301 routes the client-provided API request 316 to the endpoint 388, as represented by routing path 364. For this example, the endpoint 388 corresponds to a network services cloud computing (NWSCC) instance 390, a cloud service instance, which is hosted by resources located in the central Europe geographical service region 386.

The client-provided API request 330 contains a request URL 334 containing content in the format of "<AP South>.<Cloud Provider ABC>/<Networking Services>". For this example, "<AP South>" represents one or multiple domains that designate the API request 330 as being directed to a southern Asia Pacific geographical service region 391. The client-provided API request 330 further includes an ABT 338 with an injected client identifier 340. Based on the client identifier 340, the "<AP South>" geographical service region identifier and the "<Networking Services>" API call group identifier, the CDN 301 routes the client-provided API request 330 to the endpoint 392, as represented by routing path 368. For this example, the endpoint 392 an NWSCC instance 393, which is hosted by resources located in the southern Asia Pacific geographical service region 391.

The client-provided API request 344 contains a request URL 348 containing content in the format of "<Global>.<Cloud Provider ABC>/<Identity and Access Management Services>". For this example, "<Global>" represents one or multiple domains that designate the API request 344 as being directed to a global cloud service, and "<Identity and Access Management Services>" represents one or multiple domains that correspond to a group of identity and access management-related API calls. The client-provided API request 344 further includes an ABT 352 with an injected client identifier 344. Based on the client identifier 344, the "<Global>" geographical service region identifier and the "<Identity and Access Management Services> API call group identifier, the CDN 301 routes the client-provided API request 344 to the endpoint 396, as represented by routing path 372. For this example, the endpoint 396 corresponds to a global service instance 395, which is hosted by global resources 394.

Figure 4:
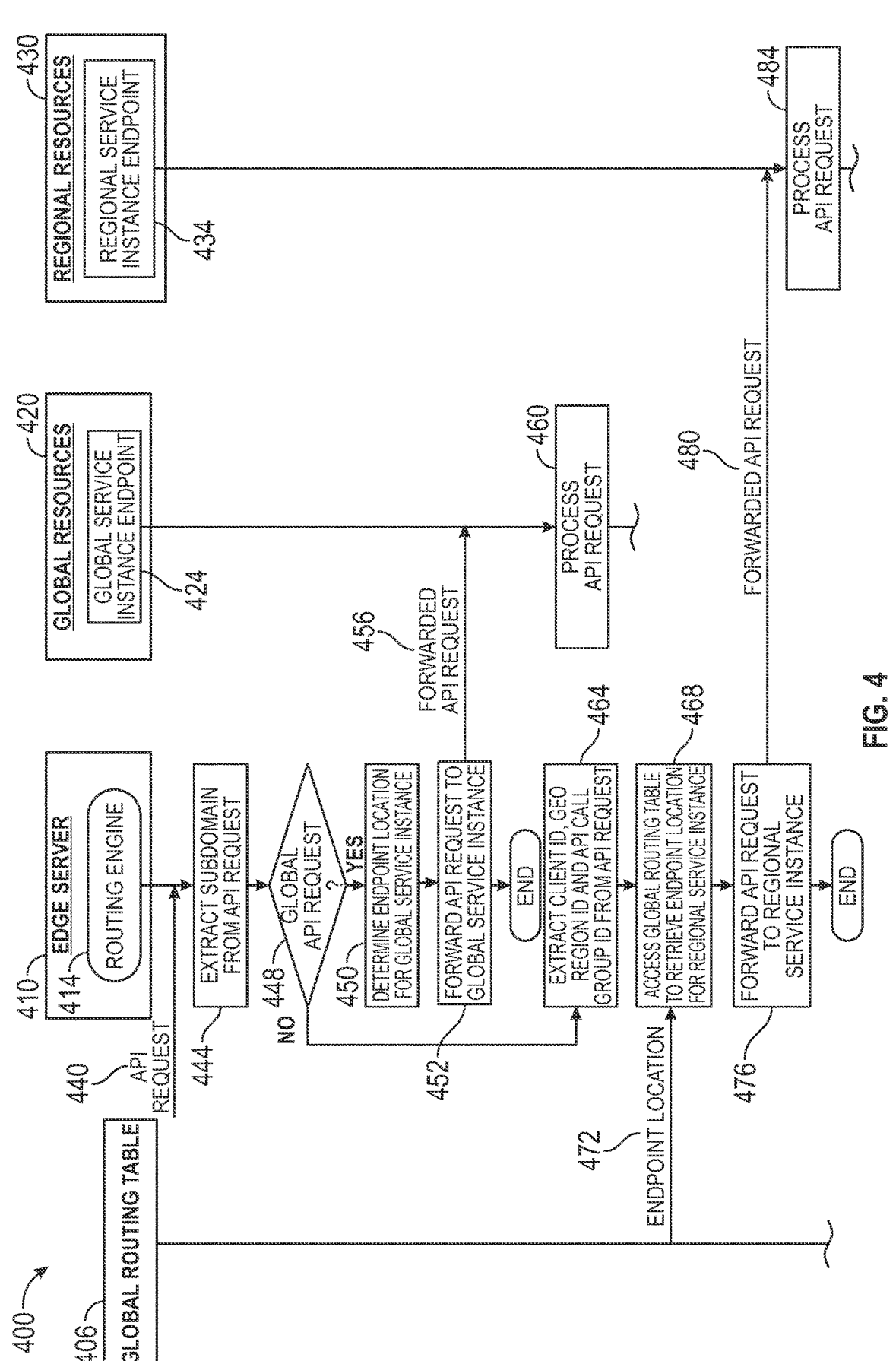
FIG. 4 is a sequence flow diagram depicting actions and communications associated with routing an API request to a cloud service instance according to an example implementation.

FIG. 4 is a sequence flow diagram 400 that depicts actions and communications that are associated with routing an API request to a cloud service instance, according to an example implementation. For this example, an edge server 410 and global routing table 406 may the same or similar to the edge server 140 (see FIG. 1A) and the global routing table 156 (see FIGS. 1A and 1B), respectively. FIG. 4 further depicts a global service instance endpoint 424 that is associated with a global service instance hosted by global resources 420 and a regional service instance endpoint 434 that is associated with a regional service hosted by regional resources 430.

Referring to FIG. 4, a routing engine 414 of the edge server 410 may receive an API request 440. In an example, the API request 440 may be provided by a cloud service client. As depicted at 444, the routing engine 414 extracts a subdomain from the API request. In accordance with example implementations, the subdomain corresponds to a geographic service region identifier.

If, as depicted at 448, the routing engine 414 determines that the API request 440 is directed to a global service instance, then the routing engine 414 determines an endpoint location for the global service instance. In accordance with example implementations, this determination may include the routing engine 414 looking up an endpoint location of the global service instance from the global routing table 406 (e.g., looking up the endpoint location based on the geographical service region identifier, the client identifier and an API call group identifier contained in the API request 440). As depicted at 452, the routing engine 414 routes, or forwards, the API request 440 to the global service instance endpoint 424. The global service instance endpoint 424 may then process the forwarded API request 456, as depicted at 460. In this context, "forwarding" a client-provided API request (e.g., the API request 440) to an endpoint (e.g., the endpoint 424) includes modifying the client-provided API request to provide a CDN-provided API request, as described herein.

If, as depicted at 448, the routing engine 414 determines that the API request 440 is directed to a regional service instance, then the routing engine 414 determines an endpoint location for the regional service instance. In accordance with example implementations, this determination may include the routing engine 414 extracting a client identifier, a geographic service region identifier and an API call group ID from the API request 440, as depicted at 464. The routing engine 414 may then access the global routing table 406, as depicted at 468, for purposes of looking up an endpoint location 472 for the regional service instance. As depicted at 476, the routing engine 414 routes, or forwards, the API request 440 to the regional service instance endpoint 434. This includes the routing engine 414 modifying the API request 440 to, among other possible modifications, modifying the request URL so that the corresponding forwarded API request 480 is routed to the regional service instance endpoint 434. The regional service instance endpoint 434 may then process the forwarded API request 480, as depicted at 484.

Figure 5:
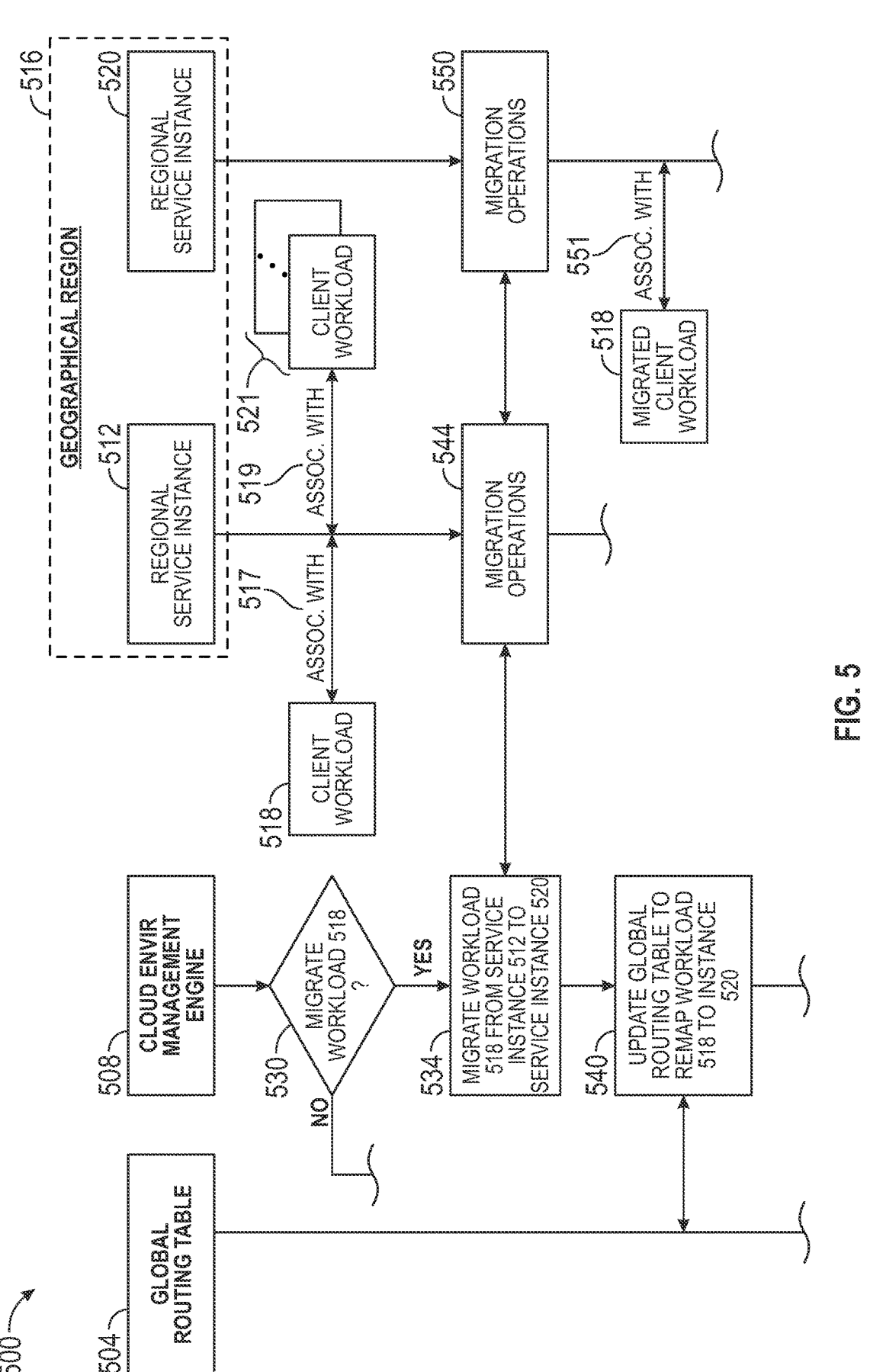
FIG. 5 is a sequence flow diagram depicting actions and communications associated with migrating a client workload between cloud service instances according to an example implementation.

FIG. 5 is a sequence flow diagram 500 depicting actions and communications associated with migrating a client workload 518 between regional service instances 512 and 520 according to an example implementation. The sequence flow diagram illustrates the dynamic API request routing capability created via the global routing table 504. For this example, the regional service instances 512 and 520 are part of the same geographical service region 516. Moreover, for this example, a cloud environment management engine 508 may have the same or similar features to the cloud environment management engine 162 (see FIG. 1A).

Referring to FIG. 5, the cloud environment management engine 508 may, as depicted at 508, determine whether or not the client workload 518 should be migrated from the regional service instance 512 to another regional service instance (the regional service instance 520 for this example). In the example depicted in FIG. 5, the regional service instance 512 is a multitenant service instance that supports the client workload 518 and one or multiple other client workloads 521. In this manner, FIG. 5 depicts, at 517, the client workload 518 being associated with the regional service instance 512 and depicts, at 519, additional client workloads 521 (for other tenants) being associated with the regional service instance 512.

The cloud environment management engine 508 may make the determination whether to migrate a workload, such as workload 518, from one service instance to another service instance, based on one or multiple criteria. In an example, the cloud environment management engine 508 may detect a resource contention issue among tenants of the instance 512. Continuing the example, the cloud environment management engine 508 may determine that for purposes of resolving the contention issue, the client workload 518 should be migrated to the regional service instance 520. In another example, the client associated with the client workload 518 may request a scaling up of resources for the client workload 518. In response to this request, the cloud environment management engine 508 may determine to migrate the workload 518 to the regional service instance 520. In another example, based on measured performance metrics associated with the regional service instance 512, the cloud environment management engine 508 may determine to migrate the client workload 518 to the regional service instance 520. In another example, a client associated with the client workload 518 may upgrade a service subscription so that the client workload 518 is to be handled by a single tenant workload, and in response to the upgrade, the cloud environment management engine 508 instantiates the regional service instance 520 and migrates the client workload 518 to the regional service instance 520.

If, as depicted at 530, the cloud environment management engine 508 determines to migrate the client workload 518, then the cloud environment management engine 508 identifies a destination service instance for the workload 518. For the example implementation that is depicted in FIG. 5, the regional service instance 520 is the destination service instance. As depicted at 534, the cloud environment management engine 508 migrates the client workload from the regional service instance 512 to the regional service instance 520. The migration may include the cloud environment management engine 508 initiating migration operations for the regional service instance 512 and the regional service instance 520, as depicted at 544 and 550.

In an example, the migration operations 544 and 550 may include operations to migrate one or multiple virtual machines from the regional service instance 512 to the regional service instance 520. In another example, the migration operations 544 and 550 may include operations to migrate one or multiple applications from the regional service instance 512 to the regional service instance 520. In another example, the migration operations 544 and 550 may include operations to migrate one or multiple databases from the regional service instance 512 to the regional service instance 520. After the migration operations 544 and 550 are complete, the now migrated client workload 518 is associated with the regional service instance 520, as depicted at 518.

In association with the migration of the client workload 518, the cloud environment management engine 508 updates the global routing table 504, as depicted at 540, to remap the client workload 518 to the regional service instance 520. In accordance with example implementations, the remapping includes the cloud environment management engine 508 updating the corresponding record (i.e., the record corresponding to the client identifier associated with the client workload 518, the geographical service region associated with the region 516 and the appropriate API call group identifier) to change the endpoint location from the regional service instance 512 to the regional service instance 520.

A client workload may be migrated from one global cloud service instance to another global cloud service instance in a similar manner, in accordance with example implementations.

Referring to FIG. 6, in accordance with example implementations, a process 600 includes, receiving (block 604), by a server that is associated with a content delivery network, a first request that specifies an application programming interface (API) call to a cloud service. The first request includes data that represents an authorization bearer token, a geographical service region identifier and an API call group identifier. In an example, the server may be associated with a Point of Presence (POP). In an example, the server may be an edge server. In an example, the edge server may be located in a branch network that contains a client (e.g., an application) that generated the first request. SaaS, IaaS, PaaS, CaaS or DaaS cloud service instance.

In an example, the first request may contain a request Uniform Resource Location (URL). In an example, the request URL may specify an endpoint location corresponding to the server. In an example, the request URL may contain a domain name that has a subdomain that corresponds to a geographical service region identifier. In an example, the cloud service may be a regional cloud service, and the subdomain name may identify a specific geographical service region. In an example, the geographical service region identifier may indicate that a service instance is a global instance. In an example, the request URL may include query parameters that identify one or multiple API call parameters.

The process 600 includes routing (block 608), by the server, the API call to an instance of the cloud service. The routing includes determining, by the server, a client identifier based on the authorization bearer token; identifying by the server, a location of the instance based on the client identifier, the geographical region identifier and the API call group identifier; and responsive to the identification, sending, by the server, a second request that corresponds to the API call to the location.

In an example, the client identifier may be injected into an authorization bearer token of the API request. The authorization bearer token may include an authorization value that is assigned by a server to a client that generated the first request. In an example, the authorization bearer token may be a concatenation of the authorization value and a value corresponding to the client identifier. In another example, the authorization bearer token may be a JSON web token, and a client identifier may be represented by data in a payload of the JSON web token. In an example, the authorization bearer token may be contained in a header of the first request separate from a message header that contains the geographical service region identifier and the API call group identifier. In an example, the location of the instance may be represented by a domain name. In another example, the location of the instance may be represented by an IP address. In an example, identifying the location of the instance includes accessing a global routing table. In an example, identifying the location of the instance includes identifying an entry, or record, of a global routing table and reading the location from the identified record.

In an example, the API call group identifier identifies a particular group of related API calls for the cloud service. In an example, the API call group identifier may be specified in a resource path of an URL of the first request. In an example, the second request may include data from the first request modified to replace an endpoint corresponding to the server with the location of the instance.

Referring to FIG. 7, in accordance with example implementations, a non-transitory storage medium 700 stores machine-readable instructions 710 that, when executed by a machine that is associated with a point of presence of a content delivery network, cause the machine to access an application programming interface (API) request directed to a service; and process the API request to determine a client identifier associated with the API request, a geographical region associated with the API request and an API service group associated with the API request. In an example, the machine may be an edge server. In an example, the machine may be located in a branch network that contains a client (e.g., an application) that generated the first request. In an example, the API request may correspond to an API call that is directed to an SaaS, IaaS, PaaS, CaaS or DaaS cloud service instance.

In an example, the API request may contain a request Uniform Resource Location (URL). In an example, the request URL may specify an endpoint location corresponding to the machine. In an example, the request URL may contain a domain name that has a subdomain that corresponds to a geographical service region identifier. In an example, the cloud service may be a regional cloud service, and the subdomain name may identify a specific geographical service region. In an example, the geographical service region identifier may indicate that a service instance is a global instance. In an example, the request URL may include query parameters that identify one or multiple API call parameters.

In accordance with example implementations, the instructions 710, when executed by the machine, further cause the machine to access location information stored in a global data store based on the client identifier, the geographical region and the API service group. The location corresponds to an instance of the service. The instructions 710, when executed by the machine, further cause the machine to route the API request to the instance based on the location information.

In an example, the client identifier may be injected into an authorization bearer token of the API request. The authorization bearer token may include an authorization value that is assigned by a server to a client that generated the first request. In an example, the authorization bearer token may be a concatenation of the authorization value and a value corresponding to the client identifier. In another example, the authorization bearer token may be a JSON web token, and a client identifier may be represented by data in a payload of the JSON web token. In an example, the authorization bearer token may be contained in a header of the first request separate from a message header that contains the geographical service region identifier and the API call group identifier. In an example, the location of the instance may be represented by a domain name. In another example, the location of the instance may be represented by an IP address. In an example, identifying the location of the instance includes accessing a global routing table. In an example, identifying the location of the instance includes identifying an entry, or record, of a global routing table and reading the location from the identified record.

Referring to FIG. 8, in accordance with example implementations, an apparatus 800 includes a hardware processor 812 and a memory 804. The hardware processor 812 is associated with a point of presence of a content delivery network. The memory 804 stores machine-readable instructions 808 that, when executed by the hardware processor 812, cause the hardware processor 812 to receive an API request that is directed to a service; and based on a Uniform Resource Location (URL) represented by first data of the API request, determine a geographical region identifier from a subdomain name of the URL and determine an API call group identifier from a path of the URL. In examples, the hardware processor 812 may include a CPU processing core or a GPU core. In an example, the hardware processor 812 may be a component of an edge server. In an example, the machine may be located in a branch network that contains a client (e.g., an application) that generated the first request. In an example, the API request may correspond to an API call that is directed to an SaaS, IaaS, PaaS, CaaS or DaaS cloud service instance.

In an example, the API request may contain a request Uniform Resource Location (URL). In an example, the request URL may specify an endpoint location corresponding to the machine. In an example, the request URL may contain a domain name that has a subdomain that corresponds to a geographical service region identifier. In an example, the cloud service may be a regional cloud service, and the subdomain name may identify a specific geographical service region. In an example, the geographical service region identifier may indicate that a service instance is a global instance. In an example, the request URL may include query parameters that identify one or multiple API call parameters.

The instructions 808, when executed by the hardware processor 812, further cause the hardware processor 812 to, based on an authorization bearer token, represented by second data of the API request, determine a client identifier; determine a location corresponding to an instance of the service based on the geographical region identifier, the API call group identifier and the client identifier. The instructions 808, when executed by the hardware processor 812, further cause the hardware processor 812 to forward the API request to the location.

In an example, the client identifier may be injected into an authorization bearer token of the API request. The authorization bearer token may include an authorization value that is assigned by a server to a client that generated the first request. In an example, the authorization bearer token may be a concatenation of the authorization value and a value corresponding to the client identifier. In another example, the authorization bearer token may be a JSON web token, and a client identifier may be represented by data in a payload of the JSON web token. In an example, the authorization bearer token may be contained in a header of the first request separate from a message header that contains the geographical service region identifier and the API call group identifier. In an example, the location of the instance may be represented by a domain name. In another example, the location of the instance may be represented by an IP address. In an example, identifying the location of the instance includes accessing a global routing table. In an example, identifying the location of the instance includes identifying an entry, or record, of a global routing table and reading the location from the identified record.

In accordance with example implementations, identifying the location of the instance includes identifying, by the server, an entry of a table based on the client identifier, the geographical service region identifier and the API call group identifier; and reading the entry to determine the location of the instance. Among the particular advantages, API call signature uniformity is promoted, and the assignment of service instances to cloud service clients may be dynamically controlled by the cloud service provider in a manner that is transparent to the cloud service clients.

In accordance with example implementations, the entry is updated with data representing a location of the second instance responsive to a determination, by a cloud service manager, to migrate a workload associated with the client identifier from the first instance to the second instance. Among the particular advantages, API call signature uniformity is promoted, and the assignment of service instances to cloud service clients may be dynamically controlled by the cloud service provider in a manner that is transparent to the cloud service clients.

In accordance with example implementations, the data represents a Uniform Resource Location (URL) and a header. The header includes an authorization bearer token. The client identifier may be determined based on the authorization bearer token. Among the particular advantages, API call signature uniformity is promoted, and the assignment of service instances to cloud service clients may be dynamically controlled by the cloud service provider in a manner that is transparent to the cloud service clients.

In accordance with example implementations, the data represents a Uniform Resource Location (URL), and the URL includes a subdomain name that includes the geographical service region identifier. Among the particular advantages, API call signature uniformity is promoted, and the assignment of service instances to cloud service clients may be dynamically controlled by a cloud service provider in a manner that is transparent to the cloud service clients.

In accordance with example implementations, the data represents a Uniform Resource Location (URL), and the URL includes a path that contains the API call group identifier. Among the particular advantages, API call signature uniformity is promoted, and the assignment of service instances to cloud service clients may be dynamically controlled by a cloud service provider in a manner that is transparent to the cloud service clients.

In accordance with example implementations, identifying the location of the instance includes identifying a record of a lookup table based on a client identifier, the geographical service region identifier and the API call group identifier; and responsive to the identification of the record, reading the location of the instance from the record. Among the particular advantages, API call signature uniformity is promoted, and the assignment of service instances to cloud service clients may be dynamically controlled by a cloud service provider in a manner that is transparent to the cloud service clients.

In accordance with example implementations, the location of the instance corresponds to a second server of a plurality of servers located in a geographical service region corresponding to the geographical service region identifier. The plurality of servers hosts at least one other instance of the service. Among the particular advantages, API call signature uniformity is promoted, and the assignment of service instances to cloud service clients may be dynamically controlled by a cloud service provider in a manner that is transparent to the cloud service clients.

In accordance with example implementations, a third server of the plurality of servers other than the second server hosts an instance of the at least one other instance. Among the particular advantages, API call signature uniformity is promoted, and the assignment of service instances to cloud service clients may be dynamically controlled by a cloud service provider in a manner that is transparent to the cloud service clients.

In accordance with example implementations, the location of the instance is in a geographical service region that corresponds to the geographical service region identifier. The client identifier is constrained to a single instance of the service corresponding to the geographical service region. Among the particular advantages, API call signature uniformity is promoted, and the assignment of service instances to cloud service clients may be dynamically controlled by a cloud service provider in a manner that is transparent to the cloud service clients.

The detailed description set forth herein refers to the accompanying drawings. Wherever possible, the same reference numbers are used in the drawings and the foregoing description to refer to the same or similar parts. It is to be expressly understood, however, that the drawings are for the purpose of illustration and description only. While several examples are described in this document, modifications, adaptations, and other implementations are possible. Accordingly, the detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "connected," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:

receiving, by a server associated with a content delivery network, a first request specifying an application programming interface (API) call to a cloud service, wherein the first request comprises data representing an authorization bearer token, a geographical service region identifier and an API call group identifier; and routing, by the server, the API call to an instance of the cloud service, wherein the routing comprises:

determining, by the server, a client identifier based on the authorization bearer token;

identifying, by the server, a location of the instance based on the client identifier, the geographical service region identifier and the API call group identifier; and responsive to the identification, sending, by the server, a second request corresponding to the API call to the location.

2. The method of claim 1, wherein identifying the location of the instance comprises:

identifying, by the server, an entry of a table based on the client identifier, the geographical service region identifier and the API call group identifier; and reading the entry to determine the location of the instance.

3. The method of claim 2, further comprising:

responsive to determining, by a cloud service manager, to migrate a workload associated with the client identifier from the instance to a second instance of the cloud service, updating the entry with data representing a location of the second instance.

4. The method of claim 1, wherein the data represents a uniform resource location (URL) and a header, and the header comprises an authorization bearer token, the method further comprising determining the client identifier based on the authorization bearer token.

5. The method of claim 1, wherein the data represents a uniform resource location (URL), and the URL comprises a subdomain name that contains the geographical service region identifier.

6. The method of claim 1, wherein the data represents a uniform resource location (URL), and the URL comprises a path that contains the API call group identifier.

7. The method of claim 1, wherein identifying the location of the instance comprises:

identifying a record of a lookup table based on the client identifier, the geographical service region identifier and the API call group identifier; and responsive to the identification of the record of the lookup table, reading, from the record, the location of the instance.

8. The method of claim 1, wherein:

the location of the instance corresponds to a second server of a plurality of servers located in a geographical service region corresponding to the geographical service region identifier; and the plurality of servers hosts at least one other instance of the service.

9. The method of claim 8, wherein a third server of the plurality of servers other than the second server hosts an instance of the at least one other instance.

10. The method of claim 1, wherein the location of the instance is in a geographical service region corresponding to the geographical service region identifier, the method further comprising constraining the client identifier to a single instance of the service corresponding to the geographical service region.

11. A non-transitory storage medium that stores machine-readable instructions that, when executed by a machine associated with a point of presence of a content delivery network, cause the machine to:

access an application programming interface (API) request directed to a service;

process the API request to determine a client identifier associated with the API request, a geographical region associated with the API request and an API call group associated with the API request;

access location information stored in a global data store based on the client identifier, the geographical region and the API call group, wherein the location information corresponds to an instance of the service; and route the API request to the instance based on the location information.

12. The storage medium of claim 11, wherein the instructions, when executed by the machine, further cause the machine to:

process the API request to extract, from a uniform resource location (URL) of the API request, a subdomain of a domain name contained in the URL; and determine the geographical region based on the subdomain.

13. The storage medium of claim 11, wherein the instructions, when executed by the machine, further cause the machine to:

process the API request to extract, from a uniform resource location (URL) of the API request, a resource path; and determine the API call group based on the resource path.

14. The storage medium of claim 11, wherein the instructions, when executed by the machine, further cause the machine to:

process the API request to extract, from a header of the API request, an authorization bearer token; and determine the client identifier based on the authorization bearer token.

15. The storage medium of claim 11, wherein the instructions, when executed by the machine, further cause the machine to:

access a global routing table of the global data store;

identify a record of the global routing table based on the client identifier, the geographical region identifier and the API call group identifier; and read data from the record representing the location information.

16. An apparatus comprising:

a hardware processor associated with a point of presence of a content delivery network; and a memory to store machine-readable instructions that, when executed by the hardware processor, cause the hardware processor to:

receive an API request directed to a service;

based on a Uniform Resource Location (URL) represented by first data of the API request, determine a geographical region identifier from a subdomain name of the URL and determine an API call group identifier from a path of the URL;

based on an authorization bearer token represented by second data of the API request, determine a client identifier;

determine a location corresponding to an instance of the service based on the geographical region identifier, the API call group identifier and the client identifier; and forward the API request to the location.

17. The apparatus of claim 16, wherein the instructions, when executed by the hardware processor, further cause the hardware processor to:

generate a second API request, wherein the second API request comprise a URL that identifies the location corresponding to the instance; and send the API request to the location.

18. The apparatus of claim 16, wherein the API request corresponds to a representational state transfer (REST) API model.

19. The apparatus of claim 16, wherein the instructions, when executed by the hardware processor, further cause the hardware processor to:

identify an entry of a table based on the client identifier, the geographical service region identifier and the API call group identifier; and read the entry to determine the location.

20. The apparatus of claim 19, wherein the instructions, when executed by the hardware processor, further cause the hardware processor to access a global data store to read the entry.

\* \* \* \* \*